United States Patent Office 3,726,777
Patented Apr. 10, 1973

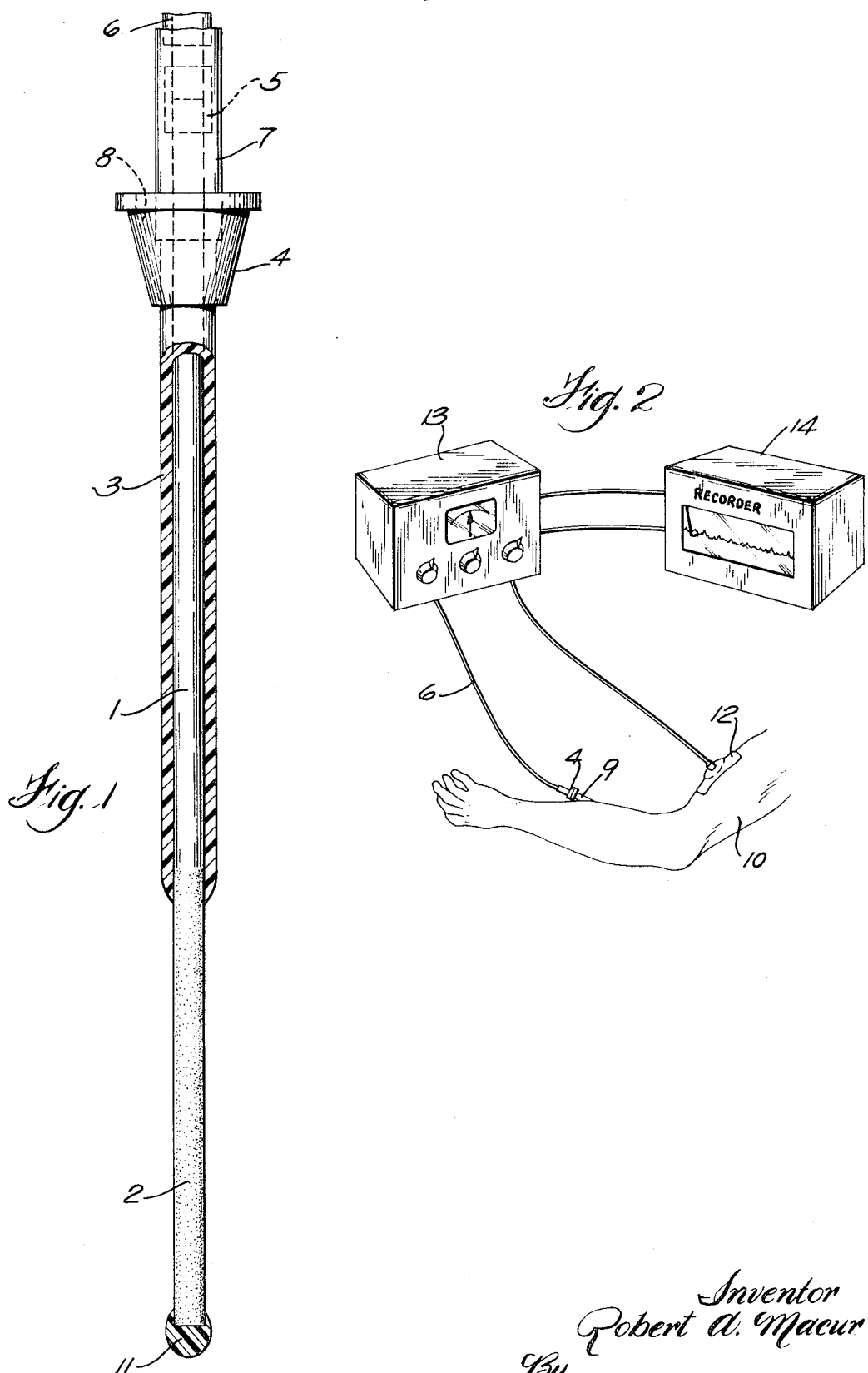

3,726,777
IRIDIUM-IRIDIUM OXIDE ELECTRODE FOR MEASURING pH OF BLOOD AND OTHER FLUIDS
Robert A. Macur, Milwaukee, Wis., assignor to General Electric Company
Filed Apr. 30, 1970, Ser. No. 33,198
Int. Cl. G01n 27/46
U.S. Cl. 204—195 R                2 Claims

ABSTRACT OF THE DISCLOSURE

A wire of iridium or iridium and its noble metal alloys is treated in a manner that makes it useful as an electrode for sensing hydrogen ion concentration or pH of blood or other fluid. The electrode may be admitted to a blood vessel through a small cannula. Variations in the difference between the potentials developed by the new electrode and a suitable reference electrode are metered and linearily related to pH changes.

BACKGROUND OF THE INVENTION

A popular method of measuring pH or hydrogen ion concentration of fluids has been to use the well-known glass electrode. This electrode is constructed with a thin glass bulb at its end which serves as a membrane to transfer ions from the test solution to its interior causing a potential to be developed. The potential difference between the glass electrode and a reference electrode is measured with what is essentially a high impedance voltmeter that is calibrated in terms of pH.

Although glass electrodes are widely used for measuring pH samples in the laboratory, they are not considered acceptable by many for continuously monitoring pH of the blood in vivo. There are several reasons for this. The bulb is subject to spontaneous fracture which may result in deposit of glass or other particles in the blood stream. The glass electrode has also been extremely expensive, selling at a price in excess of $500. Frequent breakage makes the cost even higher and this must be reflected in costs of medical care for the patient. Furthermore, the glass electrode takes about 30 minutes to equilibrate in the blood stream, so output of pH information is delayed when it is critically needed during surgery or the postoperative period of intensive care. Its size and thrombogenic properties also makes the glass electrodes less than satisfactory for use in a blood vessel.

A pH electrode is suggested in U.S. Pat. No. 2,416,949 issued to Perley et al. on Mar. 4, 1947. This patent discloses a pH sensitive electrode comprising a pure and uncoated iridium surface which is immersed in a test sample and used in conjunction with a reference electrode. The methods disclosed in this patent for preparing the electrode include sputtering and electroplating on a metal or insulating surface. The stated object is to obtain a pure nonporous iridium surface. The electrode is described in the patent as being capable of producing about 800 millivolt change over the full pH range from over 0 pH to 14 pH. The sensitivity is apparently about 43 millivolts per pH change. Data on the stability, equilibration time and linearity are not elucidated.

It may be that the plain iridium electrode is useful for measuring pH of some solutions but its usefulness for measuring pH of blood or other body fluids was not established in experiments of the present inventor. For this use, stability was lacking and sensitivity was extremely low. Test results were not reproducible. No evidence could be found in the literature that the plain iridium electrodes had ever been successfully used for monitoring the pH of biological fluids, such as blood, either in vitro or in vivo.

SUMMARY OF THE INVENTION

The following specification discloses how iridium can be made into a useful electrode for measuring the pH of blood and other fluids by a suitable surface treatment. Briefly, the invention involves forming an oxide layer on the surface or iridium or its noble metal alloys by preferably dipping a clean piece of iridium, such as a fine wire, into sodium or potassium hydroxide one or more times and then heating the wire. The treated region is then immersed in water to convert the iridate which has been formed to iridium oxide and an alkaline oxide which is converted to a soluble hydroxide by the action of the water. Upon removal from the water, the wire exhibits a blue-black coating of oxide or oxides. As such, the wire constitutes a half-cell which may be suitably insulated and mounted for use as a pH electrode in conjunction with a reference half-cell and a metering device.

From the foregoing and ensuing discussion, it will be seen that various objects of this invention are proposed and achieved.

The objects include providing a pH sensing electrode that is rugged, thin and easily and safely admissible to a blood vessel for in vivo monitoring of pH.

Other objects are to provide an electrode that is easy and inexpensive to manufacture and that can be made with the reproducible characteristics of sensitivity, linearity, stability and so forth.

Another object is to provide a pH sensing electrode that can be produced in various forms, besides the form of a fine wire, but will, nevertheless, have reproducible characteristics and will develop a potential that is substantially independent of physical form.

Another important object is to provide an electrode that may be sold for such a small price that it can be thrown away with such little loss that its sterilization and re-use are difficult to justify.

How these and other objects are achieved will now be illustrated in the ensuing detailed description of the invention in reference to the drawing.

DESCRIPTION OF THE DRAWING

FIG. 1 is a magnified view, partly in section, of the new pH sensor electrode; and FIG. 2 illustrates how the electrode is used.

DESCRIPTION OF A PREFERRED EMBODIMENT

In FIG. 1 the electrode member is seen to comprise a central iridium wire 1 which is surface treated in an exposed part 2 in accordance with methods which will be described hereinafter. Wire 1 has bonded on part of its length a circular fluid-tight insulating layer 3 which may be polythene, Teflon, or other body compatible material. The insulated portion of wire 1 extends into an adapter 4. The proximal end of the wire terminates in a stake-type connector 5 in which the bare end of an external lead wire 6 extends. Connector 5 thereby joins iridium wire 1 and external lead wire 6. An insulating sleeve 7 surrounds the region where electrode wire 1 and lead wire 6 interconnect. Sleeve 7 may be a heat shrinkable polyethylene type. The junction between the dissimilar iridium wire 1 and copper wire 6 must be kept moisture-free to avoid formation of an electrolytic coupling. Sleeve 7 or any suitable insulating material may be used for accomplishing this purpose.

The interior 8 of adapter 4 may be filled with any suitable insulating compound such as epoxy resin. This also serves the purpose of bonding the adapter 4 to the parts which pass through it.

Adapter 4 is preferably a part of what is known as a Luer-lock coupling which bayonets or interlocks in some other positive fashion with a mating part such as the open proximal end of a cannula. FIG. 2 shows adapter 4 interlocked with the proximal end of a cannula 9 that extends into a blood vessel in the arm 10 of a patient. In this manner, the electrode shown in FIG. 1 may be introduced to the blood stream of the patient for continuous monitoring of blood pH. When the electrode is in the blood stream, only coated region 2 at the distal end is in ionic communication with the blood.

To minimize the possibility of electrode wire 1 perforating the blood vessel, the distal end of the wire is provided with a polythene tip 11. This material bonds securely to the wire when the end of the latter is dipped in molten polythene and withdrawn. Other body compatible material could be substituted.

Neither the size nor shape of the electrode member 1 are critical. These physical characteristics are governed by the use for which the electrode is intended. Stable and reproducible electrodes have been made of various wire sizes ranging from one mil to twenty mils and in various shapes. A ten mil wire is a good compromise between the fragility that results when the wire is too small and the undue expense of using a larger wire. All elongated electrode members are intended to be embraced by the term wire as used herein regardless of whether the member is circular or has some other cross-sectional configuration.

Alloys of iridium with noble metals such as platinum and gold are also contemplated. An alloy of platinum and gold and as little as five percent of iridium should produce about the same potential as pure iridium when processed by methods which will be described. When any of the noble metals are alloyed with iridium, it is important that the later described processing of the electrode not be carried on at a temperature that results in oxidation of the noble metal, or the electrode may not work properly.

An important feature of the invention resides in treating the surface of electrode wire 1 so as to produce a tenacious, impervious, oxide coating in the region 2 which extends from insulating sleeve 3 and is exposed to the blood. Examples of different methods of forming the oxide layer will now be set forth.

Example 1

The end portion of a commercially pure, but otherwise untreated iridium wire is immersed in either an aqueous solution of potassium hydroxide or sodium hydroxide. The hydroxide concentration is not critical and may range from 1 N to saturation. After withdrawal from the solution, the wetted portion of the wire is heated in an oven to approximately 800° C. in oxygen or ambient air to form an iridate. The preferred heating time at 800° C. is from five to thirty minutes. A longer time is acceptable, but a shorter time sometimes results in less stable electrodes. The above process is repeated until a blue-black coating is formed. The heat treatment may be carried on anywhere in the temperature range of 700° C. to 1100° C., although about 800° C. is preferred and produces the most uniform results. Iridium oxide may volatilize above 1130° C.

A wire treated as above, is then immersed when cooled in distilled water for around twenty-four hours whereupon the iridate breaks down into iridium oxide and sodium or potassium oxide. The latter converts to sodium hydroxide or potassium hydroxide in the water and is dissolved off. The remaining coating is iridium oxide and an undetermined amount of water of hydration. The electrode is then tipped at its distal end with polyethylene and assembled as in FIG. 1.

Example 2

A mixture of fifty percent by weight of potassium hydroxide and fifty percent by weight of potassium nitrate was fused in a temperature range of from 400° C. to 500° C. and the iridium electrode was dipped in the melt whereupon the coating formed immediately. It was then withdrawn and subjected to treatment by distilled water as in Example 1. The iridium oxide coating so produced is not as adherent to the iridium as in the previous example and the potential versus silver-silver chloride electrode was approximately 200 mv. higher at all pH values. Experience shows that the process is operative when potassium nitrate ranges from 1 to 60 percent by weight with the balance being potassium hydroxide. These proportions result in a bath that fuses somewhere between 400° C. and 700° C. As the proportion of nitrate is increased, the fusing temperature approaches 700° C.

Example 3

An iridium wire is heated at around 800° to 900° C. in a highly oxidizing flame. The electrode is then cured in water for twenty-four hours and is ready for use.

The preferred commercial method of forming the electrode is in accordance with Example 1 above. Electrochemical oxidation and forming a bonded oxide layer by mixing the oxide with a sinterable bonding agent such as a polymer are also held in view, although their efficacy and economic advantages have not been determined. Also held in view is the possibility of evaporating iridium oxide or sputtering it on an iridium surface in an oxygen environment above 1130° C. at which the oxide is volatile. Example 1 has been found to the most economical method of forming the iridium oxide layer found thus far, however.

Use of the half-cell or pH sensing electrode shown in FIG. 1 is exemplified in FIG. 2. As indicated earlier, a cannula 9 is inserted in the blood stream. The electrode assembly is then passed through and locked in the cannula so that the iridium oxide coated tip region 2 is immersed in blood.

The iridium-iridium oxide half-cell is used in conjunction with a reference electrode which is generally designated by the numeral 12 is adhered to the arm 10 for the sake of example, but preferably located on the shoulder of the limb in which the pH sensor is introduced. The body serves as an ionic conduction path between the sensor and reference electrode. There are many suitable reference electrodes which may be used, but it is desirable to use a single type regularly so as to avoid the complication of calibrating for various electrodes. A suitable reference electrode is one structured in accordance with U.S. Pat. No. 3,340,868 made with components that give it the properties of a silver-silver chloride electrode. This requires that the electrode be made out of silver with a silver chloride coating and that it be used in conjunction with an electrolyte paste generally of soduim chloride.

As is well known, it is impractical to measure half-cell potentials directly so the potential of the iridium-iridium oxide half-cell is compared with that generated by a reference electrode and the variations in the difference between the potentials are related to changes in pH. Suitable instrumentation such as the high impedance device 13 for measuring potential differences in terms of pH are, of course, commercially available. A preferred read-out instrument 13 is characterized by having a high impedance amplifier input stage and subsequent stages for adjusting the slope and amplitude of the calibration graph of millivolts versus pH. Calibration is obtained using buffer solutions of known pH, in which the electrode is placed. pH values may be displayed continuously on a properly calibrated recorder 14 of a known type. The theoretical pH dependent half-cell potentials for iridium-iridium oxides electrode depend on the reactions:

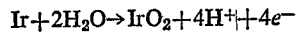

and

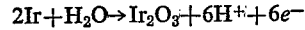

The theoretical half-cell potentials for both of these reactions is $E_0=.926$ volts at 25° C. in reference to hydrogen so that $$E_{1/2Ir}=.926-0.059 \text{ v.} \cdot pH$$

where v. is in volts at 25° C.

The half-cell potential for the silver-silver chloride-saturated NaCl reference electrode is $E_{1/2} \approx 0.200$ volts in reference to hydrogen so that the pH dependent voltage is $$EpH = E_{1/2Ir} - E_{1/2Ag}$$

which is theoretically 59 millivolts per pH and sets the maximum sensitivity limit of the system. This assumes that the above reactions define completely the pH dependent chemistry. The new electrode, however, typically produce about 63 millivolts per pH. All theoretical calculations assume standard conditions of pressure and temperature. The temperature coefficient of correction for the iridium-iridium oxide pH electrode has been determined experimentally to be $-1.035$ millivolts/C. °.

The expected range of pH in body fluids, particularly the blood, is from pH 6.8 to pH 7.8. The statistically determined normal or average pH for blood of a vital animal is pH 7.42. To be medically useful for in vivo blood monitoring, an electrode must be able to sense a .01 pH change. Since pH varies essentially around pH 7.4 in human blood, it is possible to calibrate the instrument by dipping the sensor in a buffer solution of this pH and thereby establishing one point on the plot of potential in millivolts versus pH. No appreciable error will be introduced by disregarding the slope of the calibration graph as one must when only one point is known because measurements are taken usually in a small pH variation band on each side of the point. As a matter of fact, a variation of 0.5 pH above or below 7.4 pH will most likely be fatal to the subject so measurements may be expected only over a narrow range. Regardless of omitting correction of the slope, errors are unlikely to exceed .02 pH over the entire expected range.

The exact slope may, of course, be established by checking with two buffer solutions of known pH in the expected pH range of blood or other sample fluid being tested. This provides two points on the calibration curve which may be connected by a straight line of known slope which can be established with suitable controls on the readout instrument. The new iridium-iridium oxide electrode is, however, also useful in a pH range from pH 10 to pH 14 in which range the glass electrode requires substantial correction for the effect of sodium ions overwhelming the effect of the sparse supply of hydrogen ions.

A ten mil diameter iridium-iridium oxide electrode was prepared in accordance with Example 1 described above and after a twenty-four hour break-in period of distilled water, it was used to demonstrate the electrode in a semi-clinical manner as follows:

A silver-silver chloride disposable electrode was placed on the right arm, just below the deltoid. A cylinder was taped on the wrist of that arm so that one open end was in contact with the skin, forming an open cup. Various buffer solutions at room temperature were successively placed in the cup and the iridium-iridium oxide pH electrode was introduced into the cup. The living arm was used as the ionic conductivity path. Table I contains the data obtained.

TABLE I

| pH: | Mv. vs. arm reference |
|---|---|
| 4.0 | 520 |
| 6.2 | 377 |
| 6.6 | 355 |
| 7.0 | 326 |
| 7.4 | 306 |
| 8.0 | 265 |
| 8.4 | 241 |

The slope of a plot of millivolts versus pH for this example is 63.2 mv. per pH which is typical of electrodes made in accordance with Example 1. Minor nonlinearity in the calibration graph based on this data are believed to result from commercially available standard buffers being accurate to within plus-or-minus 0.05 pH from their nominal values.

As an example of in vivo use, the right femoral artery of a dog was cannulized to accept an iridium-iridium oxide pH electrode made in accordance with Example 1. A disposable silver-silver chloride reference electrode was placed on a shaved area of the animal's leg over a coating of sodium chloride paste of a type which is commonly used in electrocardiography. Before insertion of the pH electrode in the blood vessel, a single calibration point was obtained using a tube of buffer with known 7.42 pH as in the experiment connected with getting the data for preceding Table I. The new pH electrode was then inserted through the cannula so that the distal end was directly in contact with flowing blood. The animal's blood pH was determined to be 7.43 after two minutes. After nine minutes, pH was determined to be 7.41. At this point the animal was given 1 cc. of Coramine, a respiratory stimulant, and his pH went back up to 7.43. Artificial hyperventilation was then given with a respirator at a rate of twenty inhalations and exhalations per minute, and after three minutes, his pH was determined to be 7.51 on the metering device. The electrode was withdrawn after twenty-five minutes of implant and was found to be free of blood clots.

The time for the iridium-iridium oxide electrode to produce stable output when it is immersed in a test buffer solution or the blood is about twenty-five to thirty seconds. The electrode follows changes in the pH of the blood stream very well because these changes do not occur within the body any faster than over intervals of one to three minutes. The most pronounced changes are evident when the electrode is sensing arterial blood because these changes are in response to respiration rate. Venous changes are slower and are due to changes in the metabolic system, particularly, renal function. Operative and post-operative monitoring for blood pH is usually done by placing the electrode in the artery because respiration function is critical information under such conditions. The new electrode can be made stable by maintaining it in a suitable temperature controlled buffer solution before it is introduced in a blood vessel, in which case, little or no time lapses between insertion and the production of stable and reliable readings.

In summary, an embodiment of an iridium-iridium oxide electrode that is especially adapted for in vivo monitoring of blood pH has been described. The electrode is small and may be inserted in the blood stream with minimum trauma. The electrode is rugged and without any known spontaneous modes of failure. Electrodes made in accordance with the processes described are uniform in quality and present no problems in matching them with a given readout instrument. The electrode is distinguished by its low cost compared with presently available and medically acceptable pH electrodes. The electrode may be used to measure pH of many fluids as long as they are free of hydrogen gas and have no soluble oxidation-reduction species.

Although one practical embodiment of the new iridium-iridium oxide pH sensor has been described, such description is to be considered illustrative rather than limiting, for the invention may be variously embodied and used and, therefore, is to be limited only by interpretation of the claims which follow.

I claim:

1. A system for measuring the pH of blood in a blood vessel of a vital body, comprising:
   (a) a thin elongated iridium core member comprising an electrode on which there is a coating of iridium oxide on at least a part thereof, the coated part being adapted for insertion in a blood vessel,
   (b) insulating material on said iridium core member and extending over a part of said oxide coated part, the cross-sectional size of said core and insulating material enabling it to be admitted into a blood vessel,
   (c) a half-cell reference electrode adapted to be connected with a vital body concurrently with insertion of said iridium electrode, and
   (d) means for continuously comparing the potentials of said electrodes and producing a difference potential that varies with variations in blood pH.

2. A system for measuring the pH of blood in a blood vessel of a vital body, comprising:
   (a) a thin elongated core member comprised of an alloy of iridium and gold or iridium and platinum in which alloy there is at least 5% iridium, comprising an electrode having a coating of iridium oxide on at least a part thereof, the coated part being adapted for insertion in a blood vessel,
   (b) insulating material on said core member and extending over a part of said oxide coated part, the cross-sectional size of said core and insulating material enabling it to be admitted into a blood vessel,
   (c) a half-cell reference electrode adapted to be connected with a vital body concurrently with insertion of said iridium electrode, and
   (d) means for continuously comparing the potentials of said electrodes and producing a difference potential that varies with variations in blood pH.

References Cited

UNITED STATES PATENTS

| | | | |
|---|---|---|---|
| 2,416,949 | 3/1947 | Perley et al. | 204—195 R |
| 3,133,872 | 5/1964 | Miller et al. | 204—290 F |
| 3,297,560 | 1/1967 | Schleicher | 204—290 F |

FOREIGN PATENTS

| | | | |
|---|---|---|---|
| 1,147,442 | 4/1969 | Great Britain | 204—290 F |

TA-HSUNG TUNG, Primary Examiner

U.S. Cl. X.R.

128—2.1 R